United States Patent [19]

Ingram

[11] 4,210,967
[45] Jul. 1, 1980

[54] METHOD AND APPARATUS FOR DETERMINING ACOUSTIC WAVE PARAMETERS IN WELL LOGGING

[75] Inventor: John D. Ingram, Houston, Tex.

[73] Assignee: Schlumberger Technology Corp., New York, N.Y.

[21] Appl. No.: 928,390

[22] Filed: Jul. 27, 1978

Related U.S. Application Data

[62] Division of Ser. No. 581,381, May 27, 1975, abandoned.

[51] Int. Cl.$^2$ .......................... G01V 1/40; G01V 1/28
[52] U.S. Cl. ...................................... 367/34; 364/422; 181/103
[58] Field of Search ............... 340/15.5 BH, 15.5 TN, 340/15.5 CC, 15.5 AP; 364/421, 422; 181/102, 103

[56] References Cited

U.S. PATENT DOCUMENTS 3,292,729  12/1966  Blizard ......................... 340/15.5 BH

OTHER PUBLICATIONS

Scott et al, "Acoustic Logging For Mining Applications", 6/5/74, pp. 1-10, SPWLA Fifteenth Annual Logging Symposium.

*Primary Examiner*—Nelson Moskowitz
*Attorney, Agent, or Firm*—Kenneth Olsen; Henry N. Garrana; Louis H. Reens

[57] ABSTRACT

A predetermined signal is removed from waveforms generated in an acoustic investigation of a borehole to enable the accurate detection of relatively weak formation signals. A plurality of waveforms are produced from different sonic receivers used in an acoustic investigation of an earth formation from inside casing set in a borehole. The waveforms include a casing signal which is representative of the acoustic casing wave which traveled from a transmitter through the casing to the receivers. The casing signal is removed by aligning the waveforms in accordance with the known travel times for the casing wave from the transmitter to the receivers and summing the waveforms to produce a casing signal emphasized waveform. A portion of the latter is then subtracted from the waveforms from which the casing signal is thus effectively filtered to facilitate detection and analysis of formation signals present in the waveforms.

11 Claims, 8 Drawing Figures

FOURFOLD CORRELOGRAM

FOURFOLD CORRELOGRAM

METHOD AND APPARATUS FOR DETERMINING ACOUSTIC WAVE PARAMETERS IN WELL LOGGING

This is a divisional of application Ser. No. 581,381, filed May 27, 1975, now abandoned.

FIELD OF THE INVENTION

This invention relates to a method and apparatus for well logging. More specifically, this invention relates to a method for determining parameters of acoustic waves to investigate an acoustic medium within the sphere of influence of an acoustic borehole logging tool.

BACKGROUND OF THE INVENTION

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formation surrounding the borehole. A commonly measured acoustic parameter is the velocity of compressional waves. However, other acoustic wave parameters such as the velocity of shear waves and other modes of acoustic energy are also useful in evaluating the formation.

An acoustic well logging tool for measuring the velocity of acoustic waves typically employs a sonic pulse transmitter and a plurality of sonic receivers selectively spaced from the transmitter. The sonic receivers include transducers to convert the incident acoustic wave to an electrical waveform and suitable amplifiers to transmit the waveforms to surface located processing equipment.

The spacings between the sonic receivers and the transmitter influence the character of the parameter measurement. For example, a longer spacing enables a greater effect of the formation characteristics on the sonic wave with the possibility that wave analysis can thus reveal more useful data about the formation. On the other hand, a longer spacing results in the arrival of greatly attenuated sonic waves making their analysis more difficult. When many spaced sonic receivers are employed to measure the velocity of the acoustic wave, the need to maintain adequate spacings between each of these receivers results in strongly attenuated waves.

Current sonic well logging tools commonly use one transmitter with a pair of sonic receivers. A double pair of transmitter-receivers has been used in the art, for example to provide compensation for physical misalignments of the tool in the borehole as described in the U.S. Pat. No. 3,304,537 to Schwartz. A three receiver, single transmitter sonic well logging tool has been described in U.S. Pat. No. 3,390,377 to Elliott et al. Generally, when the number of receivers is increased to improve the velocity measurement, special techniques are needed to process the increase in the flow of signals and enhance the accuracy of sonic wave parameter measurements.

The use of computers in determining any of several correlation functions between two signals is a well established field. Much literature has been written on the subject and general reference may be made, for example, to a book entitled "Statistical Communication and Detection" written by E. A. Robinson and published by the Hafner Publishing Company of New York in 1967. Of particular interest in this book is the section dealing with numerical filtering methods for digital computers. Various correlation techniques are described.

SUMMARY OF THE INVENTION

In a technique in accordance with the invention for determining an acoustic wave parameter, different receiver waveforms are initially processed to effectively remove an undesired sonic wave of a predetermined velocity. As described with reference to one embodiment, a casing wave normally traveling in the casing of a cased borehole is removed to allow the determination of wave parameters such as the compressional and shear velocities of the waves which traveled through the formation.

The wave traveling in the casing may be effectively filtered out of the waveforms by initially deriving a waveform wherein the casing signal has been emphasized. Weighted values of the emphasized casing waveform are then used to remove or filter this waveform from the detected waveforms.

The filtered waveforms may then be displayed or further processed to obtain acoustic wave parameters such as the velocities of the compressional or shear formation waves.

The acoustic wave parameter may be advantageously determined with a method of this invention by using sampled waveforms. A signal processor is used to select and combine sampled segments of the waveforms to obtain various measurements of correspondence between differently aligned segments for a determination of the acoustic wave parameter. Techniques are employed to process the sampled waveforms in a rapid manner whereby the acoustic wave parameter can be automatically determined generally about the same time the sonic waves are detected by the sonic receivers.

As described in one technique for determining an acoustic wave parameter for a well logging operation in accordance with the invention a set of waveforms from different receivers is assembled. Variously aligned segments of the waveforms in the set are combined with a multiple fold correlation technique applied to generate correlation values as a function of a range of acoustic wave parameter values. The acoustic wave parameter value which yields the best correlation, such as a peak value, or a weighted peak value, is then selected as the acoustic wave parameter for the set of waveforms.

In a preferred form for the technique of determining the acoustic wave parameter, a set of sampled waveforms is used. The samples are arranged in groups with each group being derived from a different sonic receiver. The time between samples is small, of the order of microseconds, while determination of the acoustic wave parameter can be resolved on a time scale which is less than the time interval between samples. Each sample has an index value which represents a known time interval from the occurrence of the sonic pulse which caused the waveform. In this manner the index value of the particular samples of interest in the various waveforms can be used to determine acoustic wave parameters such as the transit times or velocities of the compressional and shear waves.

It is, therefore, an object of the invention to provide a technique for accurately determining acoustic wave parameters of waves present in waveforms representative of sonic waves detected during sonic well logging.

It is a further object of the invention to provide a technique for accurately determining the velocity of acoustic waves detected with a sonic well logging tool.

The novel features of the present invention are set forth with particularity in the appended claims. The operation, together with further objects and advantages of the invention, may be best understood by way of illustration and examples of certain embodiments when taken in conjunction with the accompanying drawings.

DETAILED DESCRIPTION OF EMBODIMENT

FIGS. 1, 2, 3

Figure 1:
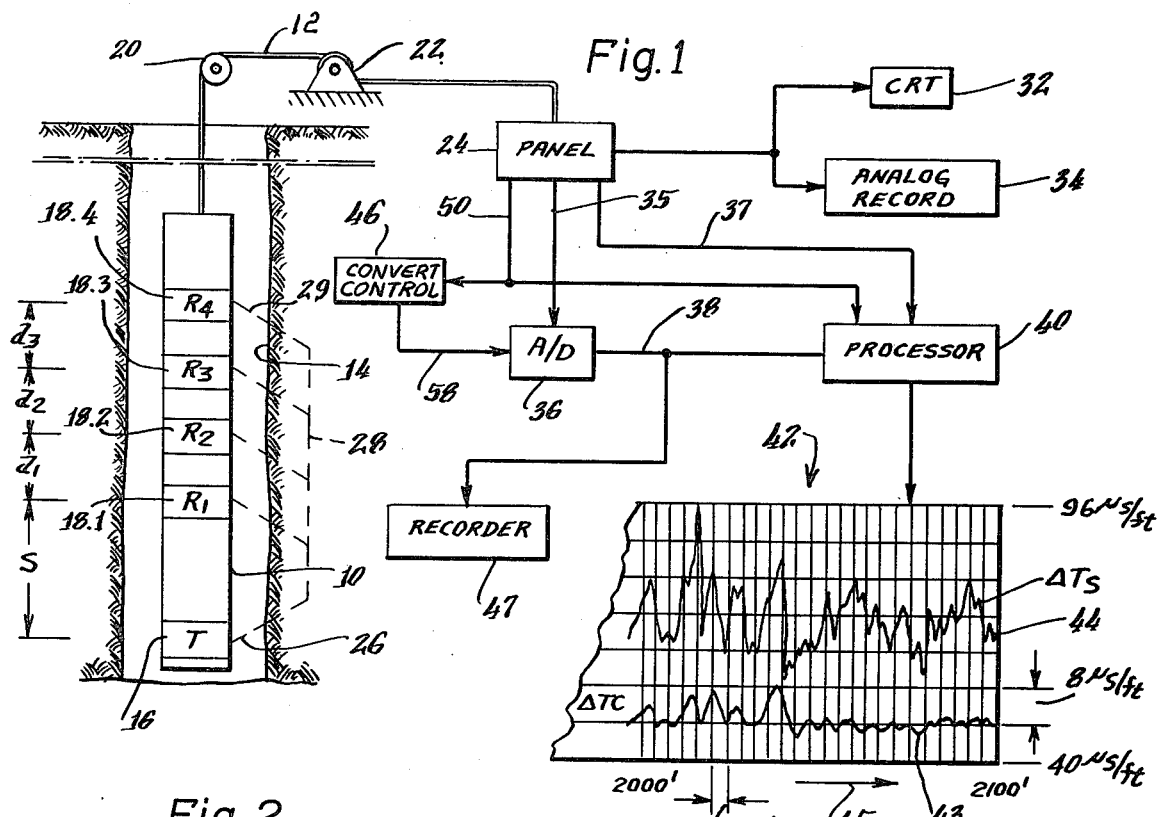
FIG. 1 is a schematic block diagram of a system employed to obtain acoustic wave parameter determinations in accordance with the invention.

With reference to FIG. 1 a sonic borehole logging tool 10, with centering elements deleted, is shown suspended from a cable 12 in a borehole 14. The tool 10 includes a transmitter 16 located at the bottom of the tool and at least three and preferably four selectively spaced sonic receivers 18.1, 18.2, 18.3 and 18.4. The cable 12 is shown fed over a pulley 20 from a cable supply 22 and is electrically connected to a panel 24. The panel 24 includes suitable amplifiers, switching circuits and electrical supplies for tool 10 and the firing of sonic transmitter 16. The tool 10 includes suitable amplifiers and controls needed to enable receivers 18 to sequentially detect sonic waves and provide panel 24 with waveforms representative of the acoustic waves incident upon transducers in receivers 18.

Figure 2:
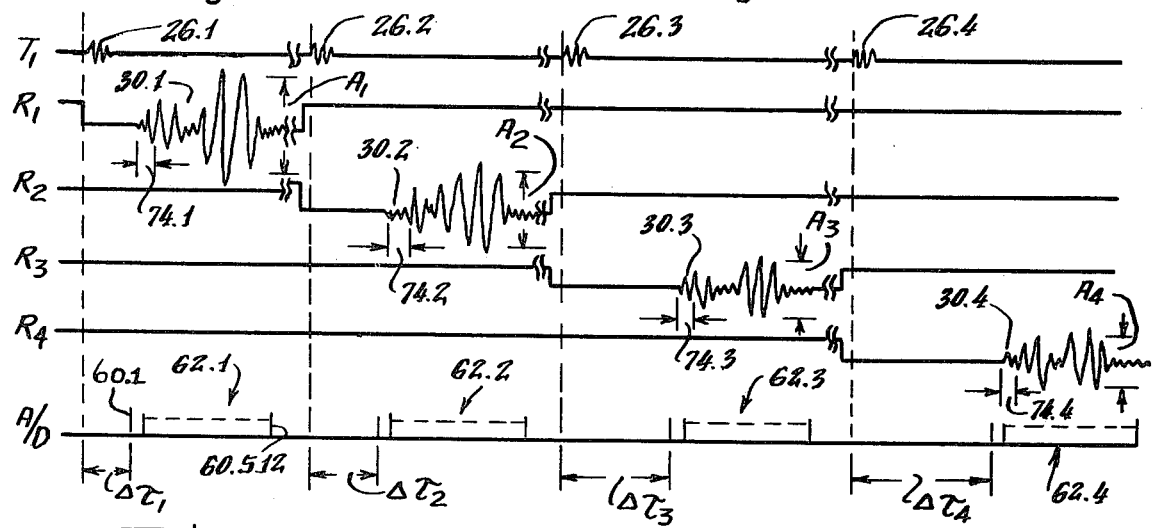
FIG. 2 is a timing diagram of the operation of several components of the system depicted in FIG. 1.

In the operation of the sonic logging tool 10, the transmitter 16 is regularly energized (about ten times per second) to produce sonic pulses such as 26 in FIG. 2 while the tool is moved upwardly at a speed of the order of a foot per second. Each pulse 26 is directed at the formation in which an acoustic wave such as 28 is launched. The acoustic wave 28 has components which travel through the formation towards the receivers 18 and in turn produce wave components 29 which are incident upon the receivers 18 to produce a set of waveforms such as 30.1, 30.2, 30.3 and 30.4 shown in FIG. 2. Waveforms 30 may also include those sonic waves which, after travel through the borehole, are incident upon receivers 18.

Although the transmitter is regularly activated, the receivers 18 preferably are alternately enabled to generate waveforms in the sequence as shown by waveforms 30.1-30.4. In this manner, waveforms which are of several milliseconds duration can be analyzed to detect acoustic wave parameters in various waveform segments such as those reflecting the presence of compressional or shear waves. In addition, the sequential enabling of receivers 18 allows their outputs to be multiplexed onto a common line towards panel 24. This is an advantage when the analog form of the outputs of receivers 18 is to be conducted to panel 24 since the analog waveforms 30 are all exposed to the same electronic amplification and cable attenuation to enable amplitude comparisons. The advance of the tool 10 during the time needed to generate one complete set of waveforms 30 can be controlled and is not sufficient to appreciably affect velocity measurements.

The receivers 18 each bear a known spacing "d" from each other while the distance "S" between receiver 18.1 and transmitter 16 is known to further accurately locate all the receivers from transmitter 16. When, for example, the arrival of the compressional wave is precisely detected at each receiver, then the time between respective receiver arrivals provides an accurate determination of the velocity of the compressional wave. By employing a multiple number of receivers 18 such as four with tool 10, a more accurate and reliable determination of wave velocities can be made.

When a large number of receivers 18 are used, the maximum peak-to-peak amplitude, A, for the waveforms 30 decreases with the distance between the receivers 18 and transmitter 16. The attenuation of the acoustic waves 28 can become so great that the resulting waveforms from the more remote receivers are difficult to use with conventional wave velocity determining techniques available in the field. Such attenuation renders velocity determinations particularly difficult when three receiver spacings "d" of the order of one foot and a transmitter to receiver spacing "S" of about eight feet is employed. An increase in the acoustic energy of pulses 26 cannot readily be used to compensate for the attenuation.

The waveforms 30 may arrive at the panel 24 either in analog form or in sampled form. For example, the tool 10 may be provided with an analog to digital (A/D) converter to sample waveforms 30. The samples are then transmitted along cable 12 to panel 24 for further processing.

In the practice of methods of this invention for automatically determining acoustic wave parameters of sonic waves generated during well logging, waveforms are produced representative of sonic waves from receivers such as 18. The waveforms may be produced in analog form such as from an analog record 34, or directly from receivers 18. Alternatively, the waveforms may be produced in sampled or digitized form from a previous sample recording or from an A/D converter 36 located either near panel 24 as shown in FIG. 1 or downhole with tool 10.

In the system depicted in FIG. 1, the waveforms 30 arrive in analog form at panel 24 where they may be coupled to a cathode ray tube 32 for real-time display and to a magnetic tape recorder 34 to provide an analog record.

Figure 8:
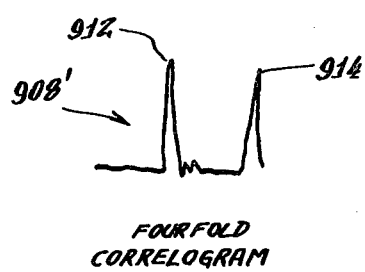

The waveforms 30 may be processed in sampled form as shown with the apparatus depicted in FIG. 1 or in analog form such as with the apparatus shown in FIG. 8. In order to utilize a sampled form of waveforms 30 they are shown coupled along a line 35 to an analog to digital converter 36 which generates samples of the waveforms at a high sampling rate on an output line 38.

Although not specifically illustrated in FIG. 1, panel 24 also provides depth signals from a depth sensor operatively coupled to the cable 12. The depth signals preferably are presented on line 37 in a format which is compatible with the format employed for the samples on line 38. The generation of depth signals is well known in the art of well logging and need not be further described. The output from waveform sampler 36 is applied to an apparatus 40 which processes the samples to produce acoustic wave parameter values of a sonic wave present in waveforms 30. The apparatus 40 preferably is a fast digital processor having inputs which can be accessed with digital samples produced with A/D converter 36.

The end product from apparatus 40 may be a plot 42 of, for example, the velocity of the compressional wave, $\Delta T$, in microseconds per foot as a function of well depth. Such plot 42 may be obtained with a plotter capable of responding either with sampled or analog outputs from processor 40.

Plot 42 is shown formed of the variation of the transit times, in microseconds per foot of two sonic waves, as a function of well depth in feet. Curve 43 shows the velocity of the compressional wave $\Delta TC$ and curve 44 shows the velocity of the shear wave $\Delta TS$. The plot 42 is made by moving suitable logging paper in the direction indicated by arrow 45 while the tool is raised as reflected by the indicated depth values.

The analog to digital converter 36 preferably is selected of the type capable of producing samples of waveforms 30 at a very high rate of the order of 4 microseconds per sample. With such high speed waveform conversions improved resolution of sonic wave parameter determinations can be made. In some instances lower sampling rates may be employed.

During the firing of transmitter 16 and sequential enabling of receivers 18, electronics in tool 10 provides waveform identification signals which may be coded pulses such as a two bit code word. Such receiver waveform identification code, together with a pulse to identify the firing time of the transmitter 16 are delivered along cable 12 to panel 24. A magnetic recorder 47 is provided to record the waveform samples produced by A/D converter 36 as well as the waveform identification code transmitted along cable 12.

Panel 24 is provided with a conversion control network 46 with which the actuation by the A/D converter 36 may be selectively delayed depending upon which receiver waveform is to be sampled. For example, if receiver waveforms 30 are each sampled by starting the same amount of time after the firing of transmitter 16 or upon occurrence of its output pulse 26, the amount of useful waveform samples will vary as a result of receiver spacings "d". In order to preserve the end segments of the waveforms for subsequent analysis, conversion control network 46 is used.

Figure 3:
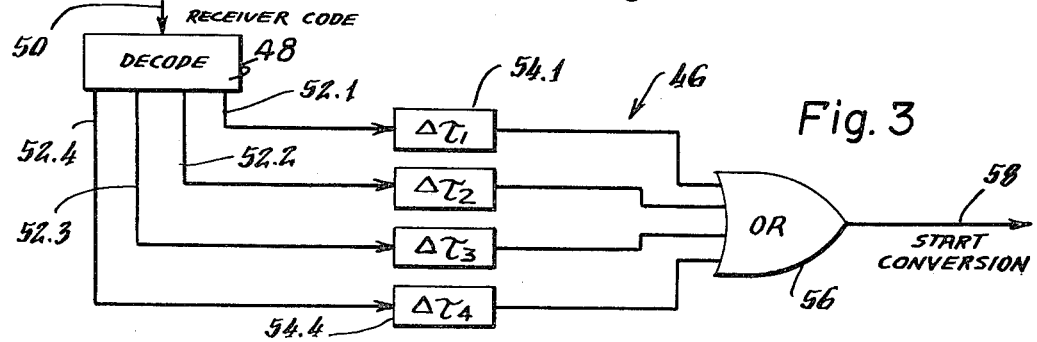
FIG. 3 is a schematic representation of a control circuit used to initiate an A/D converter.

As shown with greater detail in FIG. 3, network 46 includes a decode circuit 48 responsive to receiver or waveform identification signals on output line 50. The decode circuit 48 generates individual pulses on lines 52 representative of the particular activated sonic receiver 18. Each receiver identification pulse initiates a delay circuit 54 to inhibit actuation of the A/D converter 36 until such time when the earliest acoustic wave could arrive. Thus, as shown with waveforms 30.1 and 30.2 in FIG. 2, the A/D conversion for each receiver waveform is delayed a known time, $\Delta\tau$, which is a function of the distance between receiver 18 and transmitter 16 and the fastest expected velocity of the acoustic wave.

The delay $\Delta\tau_1$ for the first sonic receiver is selected equal to $(v \times S) - K$ where v is the fastest compressional wave velocity in microseconds per foot, S the distance between receiver 18.1 and transmitter 16 and the value of K is selected sufficient to commence the conversion process at least a small known instant before wave arrival. The delays of the conversion of electrical waveforms from the other receivers 18 are determined in a similar manner. Hence, for a spacing of S equal to eight feet, the spacings "d" of one foot each, and with a value of K equal to 12 microseconds, the respective delays from the time of firing of any transmitter pulse 26 are $\Delta\tau_1 = 308\mu$ seconds, $\Delta\tau_2 = 348\mu$ seconds, $\Delta\tau_3 = 388\mu$ seconds and $\Delta\tau_4 = 428\mu$ seconds.

These delays may be obtained using logic or analog delay circuits. The delays, once set, should remain constant so that index values employed in the operation of signal processor 40 are referenced to a common time such as the transmitter pulses 26. The outputs of delay circuits 54 may be combined with an OR circuit 56 to provide the desired enabling pulse on line 58 to commence A/D conversion.

The A/D converter 36 commences conversion at the end of each delay $\Delta\tau$. The conversion process continues for a sufficient time period to provide samples of the portions of the waveforms of interest. When a sampling rate of four microseconds is employed, a total of 512 samples, or about two milliseconds, of waveform duration as sufficient in many cases to determine acoustic wave parameters for such sonic waves as the compressional and shear waves. The number of samples used in any one group may be varied with 512 being generally used herein as an illustrative example. The number of samples is likely to change with the sampling rates with a greater number of samples being used with higher sampling rates and less samples with a lower rate. Hence, A/D converter 36 is provided with a suitable counter (not shown) which terminates the conversion process when the desired number of samples 60 (see FIG. 2) have been generated. The A/D conversion of each waveform 30 results in the generation of a group identified at 62 in FIG. 2 of 512 samples 60 as shown in FIG. 2.

Since each sample 60 occurs at a known sampling rate, any one sample has an index value which can be directly related to the time interval measured from the time of occurrence of the sonic pulse 26 which caused the waveform. Thus the first sample 60.1 in group 62.1 occurs at a time equal to $\Delta\tau_1 + (N \times SR)$, where N is the index position value (N=0 for the first sample) and SR is the sampling rate in microseconds. In a similar manner, each sample 60 in the other groups 62.2, 62.3 and 62.4 can be precisely related in time to the regularly recurring sonic pulses 26.2, 26.3 and 26.4.

Thus, if the first motion in the compressional wave is detected for the sample in group 62.1 at index value N1, and in group 62.2 at index value N2, then the time $\Delta T$ for that wave to travel the distance between receivers 18.1 and 18.3 is equal to $(N2-N1)SR + (\Delta\tau_2 - \Delta\tau_1)$. With the highest wave velocity value of $40\mu$ seconds per foot and the receiver spacing $d_1$ of one foot, and four microseconds sampling rate, the velocity of the compressional wave in microseconds per foot is $(N2-N1) \times 4 + 40$.

In some instances, the delay factors $\Delta\tau$ are so set that the A/D conversions for the receiver waveforms each begin the same interval in time after the occurrence of a sonic pulse 26. In such case the delay factors $\Delta\tau$ are all, for example, equal to zero or $\Delta\tau_1$. The measurement of a wave velocity may then be made directly by subtracting the indices for the first motions and multiplying the difference by the sampling rate.

The samples applied to processor 40 are assembled in groups of 512 samples with each group properly coded to identify a waveform from a particular receiver. The processor 40 is provided with a buffer to enable accumulation of a pair of sets of waveforms, wherein each set represents waveforms from all four receivers during a full operational cycle of the transmitter-receiver. Access to the buffer is under control by A/D converter 36 to enable transfer of the samples as they are produced.

Figure 5:
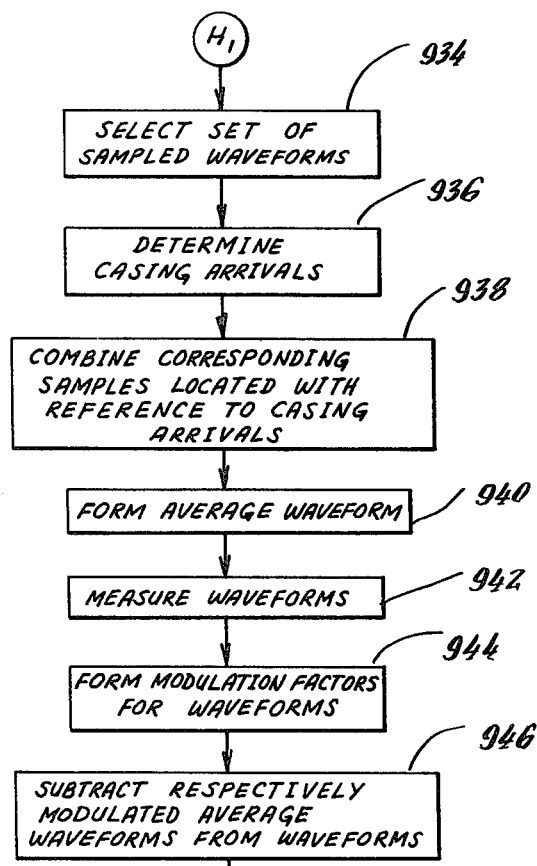
FIG. 5 is a more detailed flow chart for use with the technique shown in FIG. 27.
Figure 4:
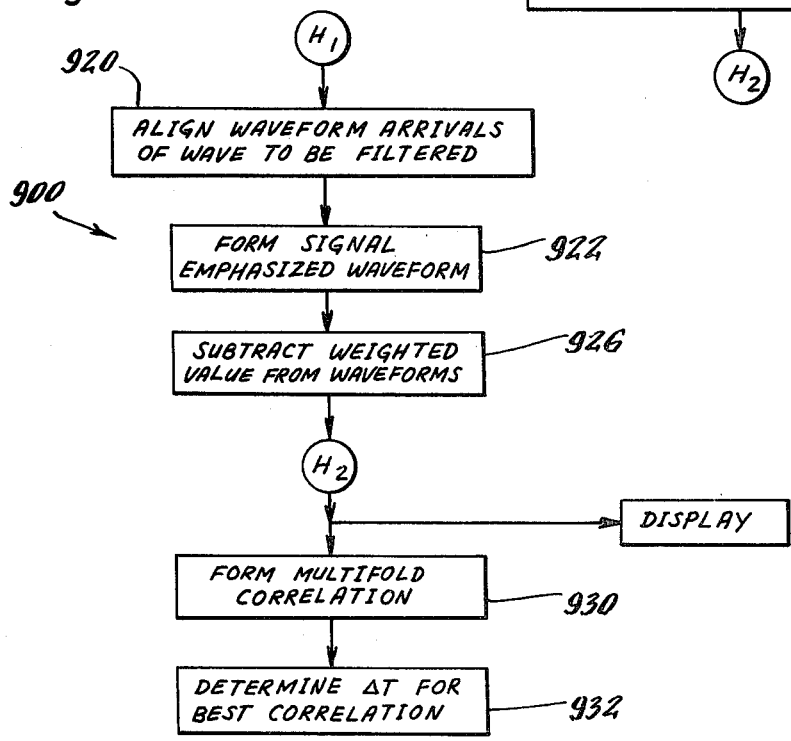
FIG. 4 is a flow chart for a technique in accordance with the invention to remove a predetermined wave from waveforms for display or an acoustic wave parameter determination.

With reference to FIGS. 4 and 5, a velocity filtering technique 900 in accordance with the invention for removing an unwanted signal, whose characteristics are generally known, from a set of waveforms is shown. Technique 900 is particularly suited for a sonic cased borehole investigation wherein the casing signal is to be removed from waveforms derived from the sonic receivers.

In sonic cased borehole investigations there are various interferences which can obscure the formation signal. A particularly difficult to manage interference arises when cement around the casing is not properly bonded to the casing. In the latter instance the casing signal does not decay sufficiently to obtain a clear indication of the formation signals. Technique 900 provides an advantageous method for removing the casing signal and thus effectively expose the desired formation signal.

Figure 6:
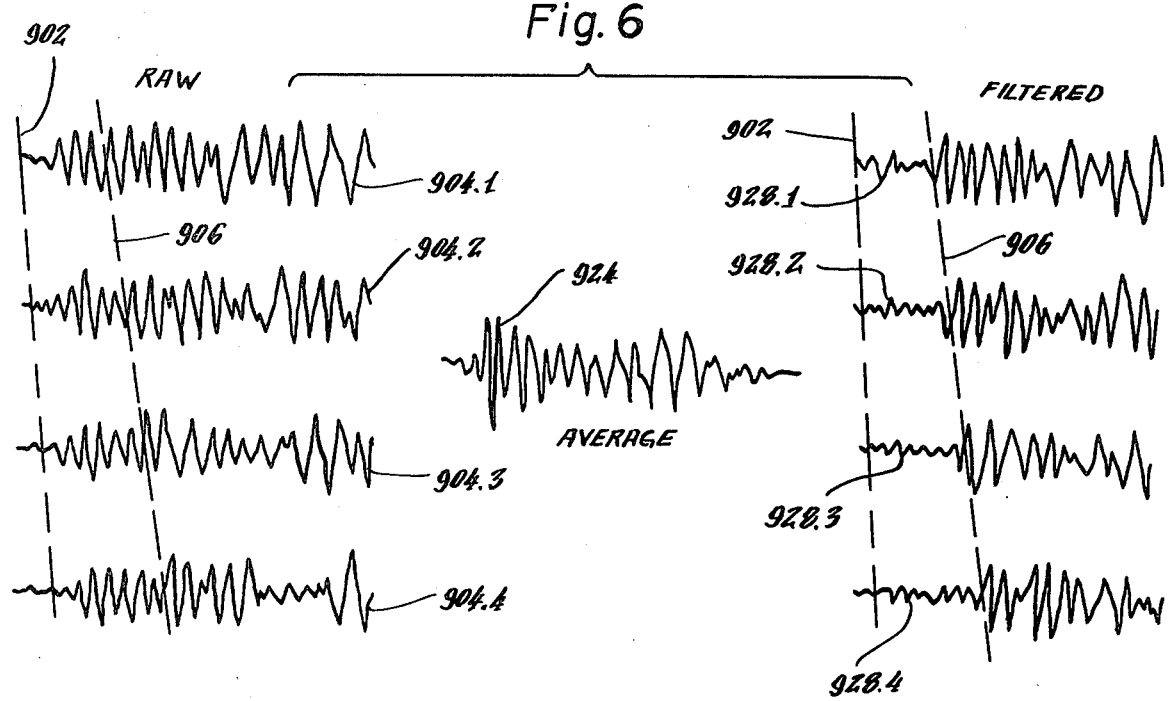
FIG. 6 is a plot of waveforms generated during the practice of the technique shown in FIG. 4.
Figure 7:
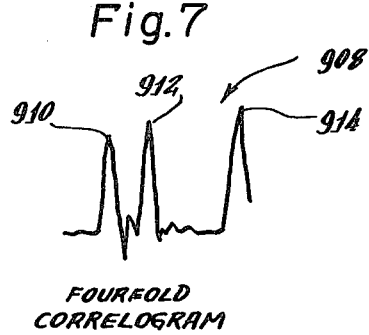
FIGS. 7 and 8 are correlograms obtained by applying a multifold correlation process in accordance with the invention to waveforms shown in FIG. 6.

The casing signal generally is characterized by a well defined velocity of nearly 59 microseconds per foot. This speed is independent of casing thickness and diameter. FIG. 6 illustrates the arrival of the casing signal with line 902 drawn across raw waveforms 904.1-904.4. These latter waveforms can be obtained from receivers 18 as described with reference to FIG. 1. The formation arrivals are identified by dashed line 906 and a four-fold correlation of cased borehole waveforms, such as 904.1-904.4, is shown with a correlogram 908 in FIG. 7.

The correlogram 908 may be obtained with a multifold correlation technique as described in my copending parent patent application now Ser. No. 928,389, filed July 27, 1978, which is a continuation of Ser. No. 581,381, filed May 27, 1975, now abandoned. The multifold correlation technique as described is incorporated herein by reference and produces correlation values, which are plotted as a function of the variable ΔT to generate correlogram 908.

The correlogram 908 illustrates three distinct peaks, 910, 912 and 914 which respectively correspond to arrivals of the casing, formation and a subsequent dominant sonic wave.

As can be seen from the raw waveforms 904 in FIG. 6, the casing signal masks the arrival of the formation signal. In order to reduce the effect of the casing signal on the processing of the waveforms, one method such as shown in FIGS. 4 and 5 may be employed.

The steps illustrated in these latter figures assume that waveforms such as 30 have been produced and are available for practicing the method 900. Sampled waveforms such as 62.1-62.4 (see FIG. 2), but representative of a cased borehole sonic investigation, are particularly suitable for use with technique 900.

Briefly, the casing signal is removed from the waveforms such as 904 by identifying the casing arrivals from the known casing signal velocity and aligning the waveforms in accordance with these arrivals as indicated at step 920 in FIG. 4. The alignment, which need not be an actual physical movement, contemplates establishing a common reference point in the waveforms, such as the casing arrivals, for executing the next step 922.

In step 922, the aligned waveforms are added so that corresponding samples of all four waveforms 904.1-904.4, with reference to the casing arrivals, are summed. The addition of the waveforms results in the emphasis of the casing signal relative to or at the expense of the formation wave. The addition results in a new waveform whose amplitude is proportional to an average of the waveforms 904.1-904.4. The summed waveform thus can be considered as an average waveform since a division of its amplitude by a factor of four yields the actual average waveform 924 as shown in FIG. 6.

The casing signal emphasized waveform 924 is then subtracted at step 926 in FIG. 4 from each of the waveforms 904 in the set to obtain velocity filtered waveforms from which the casing signal has been effectively removed. Since the average waveform 924, FIG. 6, does not have the proper amplitude for direct subtraction from each of the waveforms 904, weighted values of the average waveform 924 are subtracted.

The weighting values employed depend upon the relative magnitudes of waveforms 904 and are generated during step 926. The filtered waveforms obtained upon completion of step 926 may be plotted and have the general appearance as shown with waveforms 928.1-928.4 in FIG. 6. The filtered waveforms 928.1-928.4 may be plotted in amplitude form as illustrated or as a variable density plot.

The velocity filtered waveforms 928.1-928.4 may then be processed at steps 930 and 932 using the multiple fold correlation technique as described with reference to the aforementioned copending patent application Ser. No. 928,389 to provide a determination of an acoustic wave parameter such as ΔT of the formation.

The multifold correlation values determined during step 930 may be plotted to form a correlogram 908' as shown in FIG. 8. The correlogram 908' illustrates the effectiveness of the velocity filtering technique in that the casing correlation peak 910 has been eliminated while the formation peak 912 and the subsequent wave arrival peak 914 remain sharply defined.

FIG. 5 illustrates the steps 920, 922 and 926 shown in FIG. 4 with greater detail. At step 934 a set of sampled waveforms is selected. The sample index values for the casing arrivals are then determined at step 936 on the basis of the known velocity of the casing signal, 59 microseconds per foot, and the known distances, d, between the receivers 18 and the transmitter 16 as shown in FIG. 1.

The waveforms are then combined at step 938 by adding corresponding samples with references to the index values of the estimated casing arrivals. The summation results in a waveform wherein the casing signal is emphasized.

An average waveform, such as 924 in FIG. 6, is obtained at step 940, for example, by dividing the summed waveform by four.

The waveforms are measured at step 942. Such measurement may be obtained, for example, by scanning each of the sampled waveforms to establish a gauge value, for example the peak-to-peak value. Such waveform magnitude evaluation can be carried out by using the technique as shown and described in my copending patent application Ser. No. 928,715, which is a divisional of my aforementioned parent patent application Ser. No. 928,389 filed July 27, 1978. A first motion detection technique as described in Ser. No. 928,715 is incorporated herein by reference.

Once a gauge value for each waveform has been obtained, the relative magnitude of the gauge values are employed to determine modulation or weighting factors at step 944. In accordance with one method for determining the weighting factors, the various gauge values obtained with step 942 are averaged by summing the gauge values and subsequently dividing by four. The ratio of each waveform gauge value to the average may then be employed as a weighting factor.

At step 946 the weighting or modulation factors are multiplied with the average waveform produced at step 940 and the result subtracted from an associated waveform in the set. In this manner the generally correct amount of casing signal is removed from each of the waveforms to produce filtered waveforms such as 928 shown in FIG. 6.

Having thus described a method and apparatus in accordance with the invention for determining acoustic wave parameters of sonic waves detected during sonic borehole logging, the advantages of the invention can be appreciated. Variations of the specific steps and devices described herein may be adopted while remaining within the scope of the invention as set forth by the following claims.

What is claimed is:

1. An automatic sonic borehole investigating method operating with sonic waveforms derived from a plurality of sonic receivers which are vertically disposed in a predetermined manner in a borehole to respond to sonic waves introduced to propagate through an acoustic responsive medium by a transmitter located at preselected distances from the receivers comprising the steps of
   producing waveforms individually representative of sonic waves incident upon respective different receivers;
   estimating the arrival time of a predetermined signal in the different waveforms;
   combining the different waveforms in correspondence with an alignment of the estimated signal arrivals to form a signal emphasized waveform; and
   removing predetermined portions of the signal emphasized waveform from respectively associated waveforms to produce waveforms from which the predetermined signal is effectively filtered.

2. The automatic borehole investigating method as claimed in claim 1 and further including the step of
   displaying the filtered waveforms to provide a clarified display of other sonic waves in the waveforms.

3. The automatic borehole investigating method as claimed in claim 1 wherein the estimating step is formed by estimating the arrival of the casing signal in a cased borehole investigation to generate casing signal filtered waveforms.

4. The automatic borehole investigating method as claimed in claim 3 wherein the combining step further includes the steps of
   summing the waveforms in correspondence with the estimated casing signal arrival to generate a casing signal emphasized waveform; and
   forming a casing emphasized average waveform from the summed waveforms for use in the casing signal removal step.

5. A method for automatically determining an acoustic wave parameter of a sonic wave incident upon a plurality of sonic receivers which are vertically disposed in a predetermined manner in a borehole to respond to sonic energy introduced to propagate through an acoustic responsive medium by a transmitter located at preselected distances from the receivers comprising the steps of
   producing waveforms individually representative of sonic waves incident upon respective ones of at least four receivers;
   aligning said at least four waveforms in correspondence with arrivals of a predetermined signal to be removed from the waveforms;
   combining the aligned waveforms to form a signal emphasized waveform;
   respectively removing predetermined portions of the signal emphasized waveform from said at least four waveforms to produce filtered waveforms having the predetermined signal effectively filtered therefrom; and
   determining the acoustic wave parameter of the sonic wave from the filtered waveforms.

6. The method for automatically determining an acoustic wave parameter as claimed in claim 5 wherein the step for determining the acoustic wave parameter includes the steps of
   forming multifold correlations as a function of a range of values for the acoustic wave parameter between at least four filtered waveforms; and
   selecting the acoustic wave parameter value which produced the best correlation as a determination of the acoustic wave parameter.

7. The method for automatically determining an acoustic wave parameter as claimed in claim 5 wherein the acoustic wave parameter determining step further includes
   aligning at least four filtered waveforms in accordance with different values for the acoustic wave parameter in a predetermined range thereof;
   selecting, from said aligned filtered waveforms, segments estimated to be characteristic of the sonic wave whose acoustic parameter is to be determined;
   combining the selected aligned waveform segments for respectively different acoustic wave parameter values to obtain correspondence measurements of the alignments of the waveform segments as a function of the different acoustic wave parameter values; and
   selecting the acoustic wave parameter value yielding a preselected desired correspondence measurement to determine the acoustic wave parameter for said sonic wave.

8. The method for automatically determining an acoustic wave parameter as claimed in claim 5 wherein the step for removing the predetermined signal further includes the steps of
   measuring the waveforms to obtain respectively associated weighting factors representative of the relative magnitudes of the predetermined signal in the waveforms;
   forming modified average waveforms in accordance with the respective weighting factors; and
   subtracting the modified average waveforms from respectively associated waveforms to effectively filter the predetermined signal therefrom.

9. A method for automatically determining the velocity of a sonic wave incident upon a plurality of sonic receivers which are vertically disposed in a predetermined manner in a cased borehole to respond to casing signals and other sonic signals introduced to propagate through an acoustic responsive medium by a transmitter located at preselected distances from the receivers comprising the steps of producing a set of at least four waveforms individually representative of sonic waves incident upon respectively different receivers;

estimating the arrivals of the casing signal in the waveforms in the set;

combining the waveforms in the set in correspondence with an alignment of the estimated casing arrivals to form a casing signal emphasized waveform;

removing predetermined portions of the casing emphasized waveform from respectively associated waveforms in the set to produce a filtered set of waveforms having the casing signal effectively filtered therefrom; and determining the velocity of the sonic wave from the filtered set of waveforms.

10. The method for automatically determining the velocity of a sonic wave as claimed in claim 9 wherein the step for determining the velocity of the sonic wave further includes the steps of forming multifold correlations between the at least four filtered waveforms in the set as a function of a range of velocity values for the sonic wave; and selecting the velocity value which produced the best correlation as a determination of the velocity of the sonic wave for the set of waveforms.

11. A method for automatically determining an acoustic wave parameter for cased borehole logging from signals representative of sampled waveforms obtained from a plurality of sonic well logging receivers generating waveforms in response to sonic pulses regularly produced by a sonic pulse transmitter which is selectively vertically spaced from the sonic well logging receivers in the cased borehole comprising the steps of producing a set of sampled waveforms individually representative of sonic waves incident upon respective receivers, wherein the waveform samples have index values having a known time base relative to the sonic pulse which caused the waveform;

estimating arrival samples of a casing signal in the sampled waveforms in the set;

combining corresponding waveform samples with reference to the estimated casing signal arrivals to form a sampled waveform having an amplitude emphasized casing signal;

subtracting predetermined weighted values of the casing signal emphasized waveform from the respectively associated sampled waveforms in the set to form a set of casing velocity filtered sampled waveforms; and determining the acoustic wave parameter from the set of casing velocity filtered sampled waveforms.

* * * * *